US008277952B2

(12) United States Patent
Sugioka et al.

(10) Patent No.: US 8,277,952 B2
(45) Date of Patent: Oct. 2, 2012

(54) SLIDING MEMBER FOR COMPRESSOR

(75) Inventors: Takahiro Sugioka, Aichi-ken (JP); Takayuki Kato, Aichi-ken (JP); Atsushi Saito, Aichi-ken (JP); Shino Okubo, Aichi-ken (JP); Hiroaki Sato, Aichi-ken (JP); Taichi Nakamizo, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 26 days.

(21) Appl. No.: 12/641,777

(22) Filed: Dec. 18, 2009

(65) Prior Publication Data

US 2010/0159271 A1 Jun. 24, 2010

(30) Foreign Application Priority Data

Dec. 24, 2008 (JP) ................................. 2008-328836
Feb. 3, 2009 (JP) ................................. 2009-022934

(51) Int. Cl.
*B32B 15/04* (2006.01)
*B32B 15/18* (2006.01)
*F16H 23/00* (2006.01)
*F16J 1/02* (2006.01)

(52) U.S. Cl. ............... 428/634; 428/652; 74/60; 92/223

(58) Field of Classification Search .................. 428/650, 428/634, 652, 680, 636, 408, 704
See application file for complete search history.

(56) References Cited

U.S. PATENT DOCUMENTS 6,451,391 B1 9/2002 Yamada et al.
2002/0022129 A1* 2/2002 Moronuki ..................... 428/408

FOREIGN PATENT DOCUMENTS

| | | | |
|---|---|---|---|
| EP | 1 953 384 | A2 | 8/2008 |
| JP | 61-129205 | A | 6/1986 |
| JP | 06-131938 | A | 5/1994 |
| JP | 06-346074 | A | 12/1994 |
| JP | 2000-026195 | A | 1/2000 |
| JP | 2002-194565 | A | 7/2002 |
| JP | 2004-076756 | * | 3/2004 |

OTHER PUBLICATIONS

Machine Translation, Kida et al., JP 2004-076756, Mar. 2004.*
Machine Translation, Kitamura et al., JP 2002-194565, Jul. 2002.*
Machine Translation, Sho et al., JP 06-346074, Dec. 1994.*
Extended European Search Report (EESR) for corresponding European Patent Application No. 09 17 9680 dated Nov. 29, 2010.

* cited by examiner

*Primary Examiner* — Michael La Villa
(74) *Attorney, Agent, or Firm* — Sughrue Mion, PLLC

(57) ABSTRACT

A sliding member for a compressor includes a base metal, a first layer and a second layer. The base metal is made of an aluminum-based metal. The first layer is formed on or over the base metal and made of a nickel-based plating layer containing at least one material of nitrogen (N), silicon (Si), titanium (Ti), chromium (Cr) and aluminum (Al) as an additive. The second layer is formed on the surface of the first layer and made of a diamond-like carbon layer containing the same additive as the additive contained in the first layer.

6 Claims, 7 Drawing Sheets

FIG. 5

| | BASE METAL | INTERMEDIATE LAYER | LAYER FORMED MAINLY OF DLC | LOAD |
|---|---|---|---|---|
| EXPERIMENTAL EXAMPLE 1 | ALUMINUM | Ni-P PLATING LAYER CONTAINING Si (5μm) | DLC LAYER CONTAINING Si | 15 N |
| EXPERIMENTAL EXAMPLE 2 | | Ni-P PLATING LAYER + Ni-P PLATING LAYER CONTAINING Si (20μm) | DLC LAYER CONTAINING Si | 30 N |
| EXPERIMENTAL EXAMPLE 3 | | Ni-P PLATING LAYER + Ni-P PLATING LAYER CONTAINING Si (20μm) | DLC LAYER CONTAINING Si + DLC LAYER | 30 N |
| COMPARATIVE EXAMPLE 1 | | NONE | DLC LAYER | 5 N |
| COMPARATIVE EXAMPLE 2 | | Ni-P PLATING LAYER (5μm) | DLC LAYER | 5 N |
| COMPARATIVE EXAMPLE 3 | | Ni-P PLATING LAYER (20μm) | DLC LAYER | 5 N |

FIG. 6

| | BASE METAL | INTERMEDIATE LAYER | LAYER FORMED MAINLY OF DLC | LOAD |
|---|---|---|---|---|
| EXPERIMENTAL EXAMPLE 4 | ALUMINUM | Ni-P PLATING LAYER CONTAINING N (5μm) | DLC LAYER CONTAINING N | 15 N |
| EXPERIMENTAL EXAMPLE 5 | | Ni-P PLATING LAYER + Ni-P PLATING LAYER CONTAINING N (20μm) | DLC LAYER CONTAINING N | 30 N |
| EXPERIMENTAL EXAMPLE 6 | | Ni-P PLATING LAYER + Ni-P PLATING LAYER CONTAINING N (20μm) | DLC LAYER CONTAINING N + DLC LAYER | 30 N |
| COMPARATIVE EXAMPLE 4 | | NONE | DLC LAYER | 5 N |
| COMPARATIVE EXAMPLE 5 | | Ni-P PLATING LAYER (5μm) | DLC LAYER | 5 N |
| COMPARATIVE EXAMPLE 6 | | Ni-P PLATING LAYER (20μm) | DLC LAYER | 5 N |

FIG. 7

| | BASE METAL | INTERMEDIATE LAYER | LAYER FORMED MAINLY OF DLC | CONTENT | LOAD |
|---|---|---|---|---|---|
| EXPERIMENTAL EXAMPLE 7 | ALUMINUM | Ni-P PLATING LAYER CONTAINING Si (20μm) | DLC LAYER CONTAINING Si + DLC LAYER | 1 atm% | 22 N |
| EXPERIMENTAL EXAMPLE 8 | | Ni-P PLATING LAYER CONTAINING Si (20μm) | DLC LAYER CONTAINING Si + DLC LAYER | 22 atm% | 36 N |
| EXPERIMENTAL EXAMPLE 9 | | Ni-P PLATING LAYER CONTAINING N (20μm) | DLC LAYER CONTAINING N + DLC LAYER | 1 atm% | 20 N |
| EXPERIMENTAL EXAMPLE 10 | | Ni-P PLATING LAYER CONTAINING N (20μm) | DLC LAYER CONTAINING N + DLC LAYER | 23 atm% | 40 N |

SLIDING MEMBER FOR COMPRESSOR

BACKGROUND OF THE INVENTION

The present invention relates to a sliding member for a compressor.

In a piston type compressor having a hemispherical shoe as a sliding member disposed between a piston and the sliding surface of a swath plate, the shoe has on the surface thereof a coating layer having relatively good sliding to property for preventing wear of the sliding surfaces between the swash plate and the shoe, and also between the piston and the shoe.

The use of a diamond-like carbon (amorphous hard carbon film) as a coating layer on the shoe surface is disclosed, for example, in Japanese Patent Publication Application No. 6-346074. The diamond-like carbon layer is a hard carbon film having excellent sliding property under severe lubrication condition.

However, in a case where an aluminum alloy having relatively low hardness is used for a base metal of the shoe and the diamond-like carbon layer is formed directly on the surface of the shoe, the diamond-like carbon layer tends to be separated or peeled off from the base metal due to a large difference in hardness between the base metal and the diamond-like carbon layer.

Japanese Patent Application Publication No. 2002-194565 discloses a shoe having on the surface of the base metal thereof a nickel-phosphorus plating layer as a nickel-based plating layer and a diamond-like carbon layer formed on the surface of the nickel-phosphorus plating layer. The difference in hardness between the nickel-phosphorus plating layer and the diamond-like carbon layer is smaller than that between the base metal and the diamond-like carbon layer, which makes possible to prevent the diamond-like carbon layer being separated or peeled off from the base metal of the shoe when the diamond-like carbon layer having relatively high hardness is formed on the base metal made of an aluminum-based metal.

In the case where the diamond-like carbon layer is provided directly on the nickel-phosphorus plating layer, however, there is a problem in that adhesion of the diamond-like carbon layer to the nickel-phosphorus plating layer is low.

Therefore, the present invention is directed to a sliding member for a compressor which can improve the adhesion between the nickel-based plating layer and the diamond-like carbon layer.

SUMMARY OF THE INVENTION

In accordance with the present invention, a sliding member for a compressor includes a base metal, a first layer and a second layer. The base metal is made of an aluminum-based metal. The first layer is formed on or over the base metal and made of a nickel-based plating layer containing at least one material of nitrogen (N), silicon (Si), titanium (Ti), chromium (Cr) and aluminum (Al) as an additive. The second layer is formed on the surface of the first layer and made of a diamond-like carbon layer containing the same additive as the additive in the first layer.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which:

FIG. 5 is a comparative table showing test results of three experimental examples 1 through 3 of the present invention and three comparative examples 1 through 3;

FIG. 6 is a comparative table showing test results of three experimental examples 4 through 6 and three comparative examples 4 through 6; and FIG. 7 is a comparative table showing test results of three experimental examples 7 through 10 of the present invention.

DETAILED DESCRIPTION OF THE PREFERRED EMBODIMENTS

Figure 1:
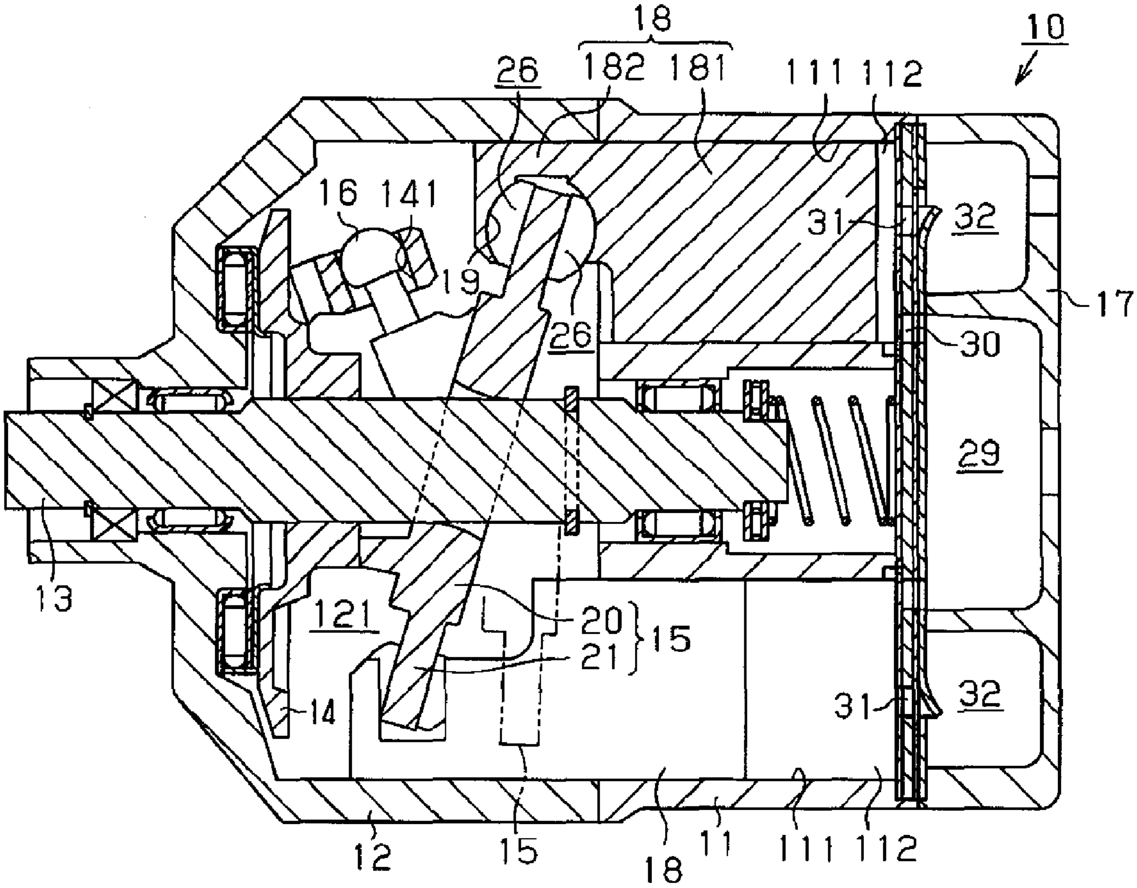
FIG. 1 is a longitudinal sectional view showing a piston type compressor having a shoe according to preferred embodiments of the present invention.
Figure 2:
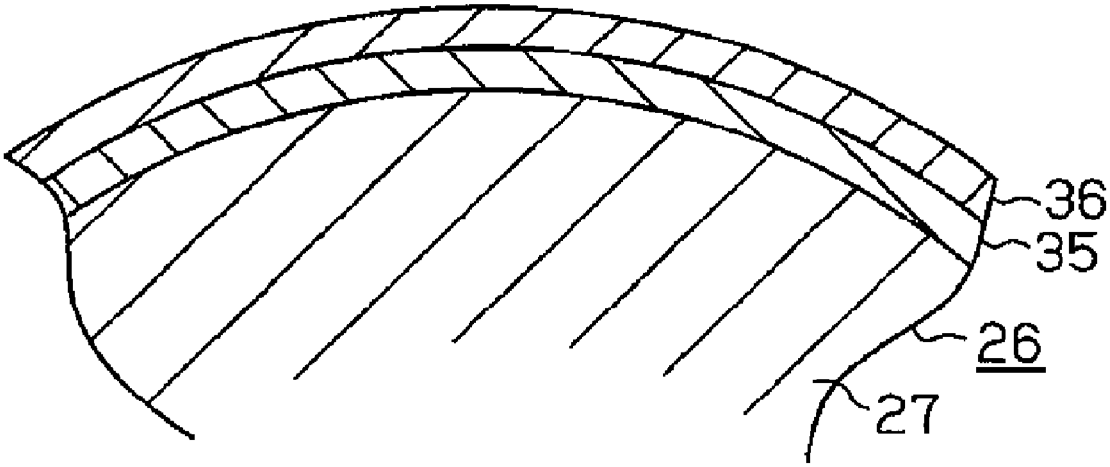
FIG. 2 is a fragmentary partially enlarged view showing a part of the shoe of the compressor according to a first preferred embodiment of the present invention.

The following will describe a sliding member for a compressor according to a first preferred embodiment of the present invention as embodied in a shoe of a variable displacement piston type compressor with reference to FIGS. 1 and 2.

Referring to FIG. 1, the variable displacement piston type compressor 10 has a compressor housing including a cylinder block 11, a front housing 12 connected to the front end of the cylinder block 11 and a rear housing 17 connected to the rear end of the cylinder block 11. A pressure control chamber 121 is formed between the front housing 12 and the cylinder block 11, and a suction chamber 29 and a discharge chamber 32 are formed in the rear housing 17. The cylinder block 11 and the front housing 12 support a rotary shaft 13 which is driven to rotate by a external drive source such as a vehicle engine.

A lug plate 14 is secured to the rotary shaft 13, and a swash plate 15 is supported by the rotary shaft 13 so as to be slidable in the axial direction of the rotary shaft and tiltable relative to the axis of the rotary shaft 13. The base metal of the swash plate 15 is made of a ferrous metal. The swash plate 15 includes an annular base portion 20 and an annular sliding portion 21 formed at the outer periphery of the base portion 20. The swash plate 15 is tiltable relative to the axis of the rotary shaft 13 and rotatable integrally with the rotary shaft 13 by virtue of engagement between a guide hole 141 formed in the lug plate 14 and a guide pin 16 projecting from the base portion 20 of the swash plate 15.

A plurality of cylinder bores 111 (only two cylinder bores 111 are shown in FIG. 1) is formed through the cylinder block 11 to receive therein pistons 18, respectively. The piston 18 includes a neck portion 182 and a head portion 181. The head portion 181 is fitted in the cylinder bore 111 so as to form a compression chamber 112 in the cylinder bore 111. The compression chamber 112 is communicable with the suction chamber 29 through a suction hole 30 and with the discharge chamber 32 through a discharge hole 31. The piston 18 is made of an aluminum-based metal containing silicon. The neck portion 182 has a recess 19 formed therein and the sliding portion 21 of the swash plate 15 is inserted into the recess 19.

A pair of front and rear hemispherical shoes 26 each serving as a sliding member is fitted between the inner peripheral surface of the recess 19 and the front and rear surfaces of the sliding portion 21 of the swash plate 15, respectively. The rotation of the swash plate 15 is converted into the reciprocating movement of the piston 18 through the pair of the front and rear shoes 26, so that the piston 18 reciprocates in the cylinder bore 111.

When the piston 18 moves leftward in the cylinder bore 111 as seen in FIG. 1, refrigerant gas in the suction chamber 29 is flowed into the compression chamber 112 through the suction hole 30. When the piston 18 moves rightward in the cylinder bore 111 as seen in FIG. 1, refrigerant gas in the compression chamber 112 is compressed and flowed out into the discharge chamber 32 through the discharge hole 31.

The following will describe the shoes 26 in detail. Referring to FIG. 2, the shoe 26 has a base metal 27 made of an aluminum-based metal. A first coating layer 35 made of a nickel-based plating layer containing silicon (Si) serving as an additive is formed on or over the surface of the base metal 27. Specifically, the first coating layer 35 is made of a nickel-phosphorus plating layer containing Si (Ni—P plating layer containing Si). The first coating layer 35 is formed on the surface of the base metal 27 by dipping the base metal 27 into a plating solution containing silicon-based surface-active agent, which is called electroless plating. The first coating layer 35 may be formed on the surface of the base metal 27 by electroplating.

A second coating layer 36 made of a diamond-like carbon layer containing Si as an additive is formed on the surface of the first coating layer 35 Hereinafter, diamond-like carbon will be referred to as “DLC”. The adhesion of the second coating layer 36 to the first coating layer 35 is increased with an increase of the concentration of silicon in the second coating layer 36.

In forming the second coating layer 36, firstly the surface of the first coating layer 35 is cleaned by sputtering so as to remove the oxide film formed on the surface. Then, silicon is ion-implanted into the surface of the first coating layer 35, and then DLC containing Si is deposited on the first coating layer 35. In other words, the second coating layer 36 is formed by a process of chemical vapor deposition (CVD). Alternatively, the second coating layer 36 may be formed by a process of physical vapor deposition (PVD). The shoe 26 is formed in such a manner that the first coating layer 35 as an intermediate layer is formed between the base metal 27 and the second coating layer 36, and the first and second coating layers 35, 36 both containing Si are multilayered on the surface of the base metal 27.

According to the first preferred embodiment, the first coating layer 35 serves as a first layer and the second coating layer 36 serves as a second layer.

According to the first preferred embodiment described above, the following advantageous effects are obtained.

(1) The first coating layer 35 is formed on or over the surface of the base metal 27 made of an aluminum-based metal, and the second coating layer 36 is formed on the surface of the first coating layer 35. The first coating layer 35 is made of a metal layer containing Si and the second coating layer 36 is made of a ceramic layer containing Si. Because the first coating layer 35 and the second coating layer 36 both contain Si, the second ceramic coating layer 36 is formed over the first metal coating layer 35 with strong adhesion. Thus, the adhesion between the first and second coating layers 35, 36 is improved, so that the second coating layer 36 is prevented from being separated or peeled off from the first coating layer 35.

(2) The hardness of the first coating layer 35 made of a Ni—P plating layer is lower than that of the second coating layer 36 made of DLC layer, but higher than that of the base metal 27 of the shoe 26 made of an aluminum-based metal. Thus, the difference in hardness between DLC and an object member to which DLC is formed is reduced and, therefore, the stress generated in the DLC layer is reduced and the second coating layer 36 is prevented from being separated or peeled off from the first coating layer 35.

(3) The first coating layer 35 formed by electroless plating is formed only by dipping the shoe 26 into a plating solution, which is preferable for forming the first coating layer 35 on the entire surface of the base metal 27 of the shoe 26.

Figure 3:
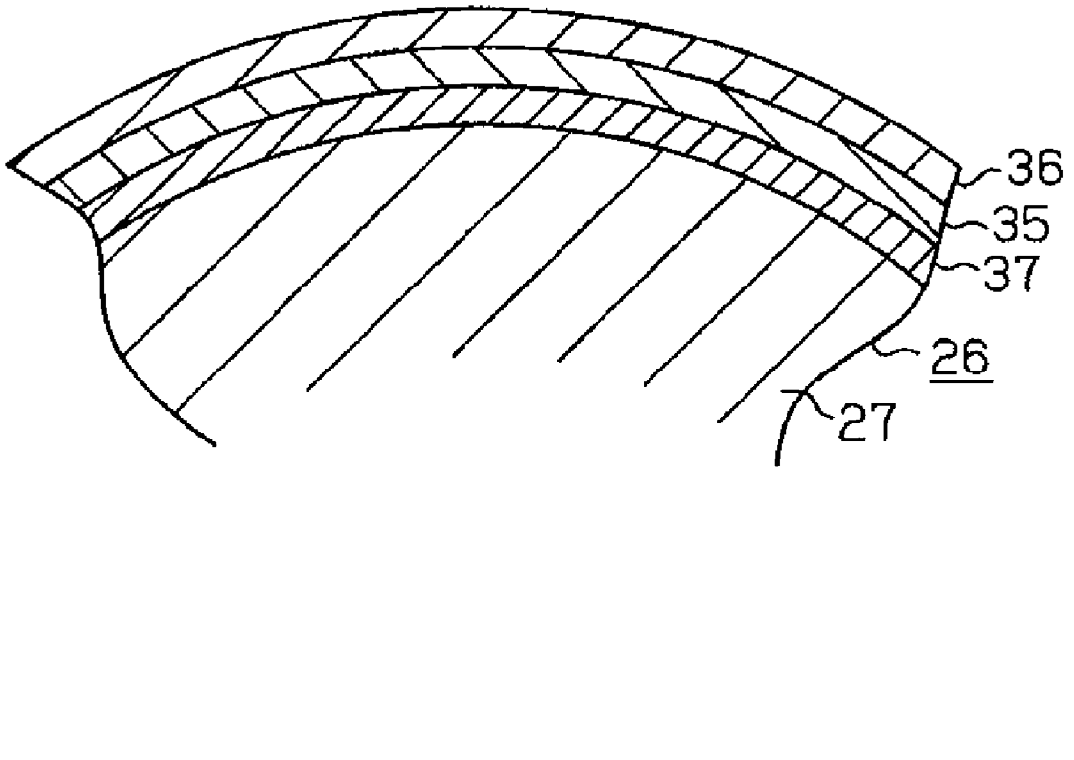
FIG. 3 is a fragmentary partially enlarged view showing a part of the shoe of the compressor according to a second preferred embodiment of the present invention.

The following will describe a sliding member for a compressor according to the second preferred embodiment of the present invention as embodied to a shoe for the variable displacement piston type compressor with reference to FIG. 3.

In the second preferred embodiment, the same reference numerals are given to the same parts as those of the first embodiment, and a redundant description thereof will be omitted or simplified.

Referring to FIG. 3, the shoe 26 is formed in such a manner that a nickel-phosphorus plating layer (Ni—P plating layer) 37 containing no silicon as an additive is formed on the surface of the base metal 27, and the first coating layer (Ni—P plating layer) 35 which is the same coating layer as that of the first preferred embodiment is formed on the surface of the Ni—P plating layer 37. In other words, the shoe 26 of the second preferred embodiment has the Ni—P plating layer 37 containing no additive which is contained in the first coating layer 35 between the base metal 27 and the first coating layer 35.

The shoe 26 further has the second coating layer (DLC layer containing Si) 36 of the first preferred embodiment on the surface of the first coating layer 35. According to the second preferred embodiment, the first coating layer 35 and the Ni—P plating layer 37 serves as an intermediate layer between the base metal 27 and the second coating layer 36. The thickness of the intermediate layer according to the second preferred embodiment is greater than the first coating layer 35 of the first preferred embodiment.

According to the second preferred embodiment, the first coating layer 35 serves as a first layer, the second coating layer 36 serves as a second layer, and the Ni—P plating layer 37 serves as a third layer.

Therefore, the second preferred embodiment has the following advantageous effects in addition to the effects (1) through (3) of the first preferred embodiment.

(4) According to the second preferred embodiment, the thickness of the intermediate layer provided between the base metal 27 and the second coating layer 36 is increased, so that the intermediate layer is hardly deformed and, therefore, the second coating layer 36 is prevented from being cracked.

Figure 4:
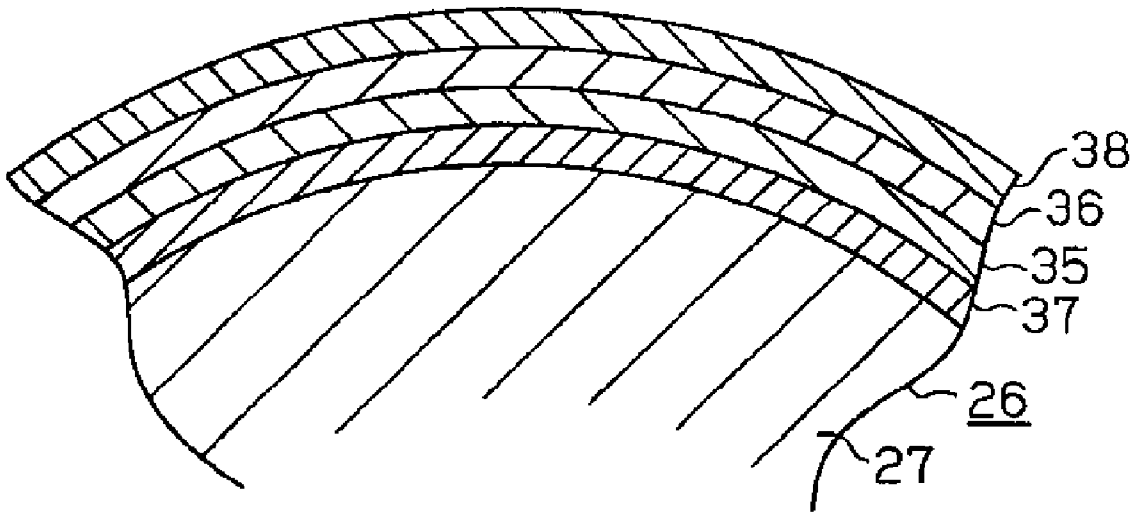
FIG. 4 is a fragmentary partially enlarged view showing a part of the shoe of the compressor according to a third preferred embodiment of the present invention.

The following will describe a sliding member for a compressor according to a third preferred embodiment of the present invention as embodied in the shoe of the variable displacement piston type compressor with reference to FIG. 4. In the third embodiment, the same reference numerals are given to the same parts as those of the first and second embodiments described, and a redundant description thereof will be omitted or simplified.

As shown in FIG. 4, the shoe 26 of the third preferred embodiment has the nickel-phosphorus plating layer (Ni—P plating layer) 37 containing no silicon (Si) as an additive and formed on the surface of the base metal 27 and the first coating layer 35 made of Ni—P plating layer containing Si which is the same as that of the first preferred embodiment and formed on the surface of the Ni—P plating layer 37. Thus, the shoe 26 of the third preferred embodiment has the Ni—P plating layer 37 containing no additive which is contained in the first coating layer 35 between the base metal 27 and the first coating layer 35.

The shoe 26 of the third preferred embodiment further has the second coating layer (DLC layer containing Si) 36 formed on the surface of the first coating layer 35 and a diamond-like carbon layer (DLC layer) 38 containing no Si as an additive and formed on the surface of the second coating layer 36. According to the third preferred embodiment, the two coating layers made mainly of DLC are multilayered on the intermediate layer, and the thickness of these two layers of DLC is greater than the second coating layer 36 of the first preferred embodiment.

According to the third preferred embodiment, the first coating layer 35 serves as a first layer, the second coating layer 36 serves as a second layer, the Ni—P plating layer 37 serves as a third layer, and the DLC layer 38 serves as an outer layer.

Therefore, the third preferred embodiment has the following advantageous effects in addition to the effects (1) through (3) of the first preferred embodiment.

(5) The thicknesses of the intermediate layer and the layer formed mainly of DLC and formed on the intermediate layer are increased, so that these two layers are hardly deformed and, therefore, the second coating layer 36 is prevented from being cracked. The DLC layer 38 containing no Si is formed on the outer peripheral surface of the shoe 26. Thus, in comparison with a case where the second coating layer 36 is formed as the outermost layer of the shoe 26, the hardness of the outermost peripheral surface of the shoe 26 is made greater and the coefficients of friction thereof is made lower.

The following will describe the first through third preferred embodiments more in detail with reference to FIG. 5 showing experimental example 1 through 3 and comparative examples 1 through 3. Scratch test for adhesion evaluation of films was conducted using six shoes of the experimental example 1 through 3 and the comparative examples 1 through 3. The scratch test was carried out by pressing a hard indenter (diamond) having a substantially constant radius of curvature at the tip thereof against the surface of the film and scratching the surface of the film while increasing load. The value of the load when the film was separated or peeled off (value of critical load) was measured. As the value of the load becomes larger, the adhesion of the film increases.

Referring to FIG. 5, in the experimental example 1, the adhesion of the second coating layer (DLC layer containing Si) 36 was measured by the scratch test using the shoe 26 made according to the first preferred embodiment, and having an intermediate layer (Ni—P plating layer containing Si) with a thickness of about 5 μm. In the experimental example 2, adhesion of the second coating layer (DLC layer containing Si) 36 was measured by the scratch test using the shoe 26 made according to the second preferred embodiment, and having an intermediate layer (Ni—P plating layer and Ni—P plating layer containing Si) with a thickness of about 20 μm. In the experimental example 3, adhesion of the second coating layer (DLC layer containing Si) 36 was measured by the scratch test using the shoe 26 made according to the third preferred embodiment, and having an intermediate layer (Ni—P plating layer and Ni—P plating layer containing Si) with a thickness of about 20 μm. In the experimental examples 1 through 3, the second coating layer 36 contains 10 atomic percent silicon.

In the comparative example 1, adhesion of the DLC layer to the base metal 27 was measured by the scratch test using a shoe in which no intermediate layer is provided on the surface of the base metal 27 and the DLC layer containing no Si is directly provided on the surface of the base metal 27. In the comparative example 2, the adhesion of the DLC layer to the intermediate layer was measured by the scratch test using a shoe in which the Ni—P plating layer containing no Si is formed on the surface of the base metal 27 as an intermediate layer and the DLC layer containing no Si is formed on the surface of the Ni—P plating layer, and the thickness of the intermediate layer (Ni—P plating layer) was set 5 μm. In the comparative example 3, adhesion of the DLC layer to the intermediate layer was measured by the scratch test using a shoe in which the Ni—P plating layer containing no Si is provided on the surface of the base metal 27 as an intermediate layer and the DLC layer containing no Si is formed on the surface of the Ni—P plating layer, and the thickness of the intermediate layer (Ni—P plating layer) was set 20 μm.

The results of the scratch tests are shown in FIG. 5. The values of the load when the second coating layer (DLC layer containing Si) 36 began to be separated or peeled off in the experimental examples 1 through 3 were much larger than the values of the load when the DLC layer began to be separated or peeled off in the comparative examples 1 through 3. According to the experimental examples 1 through 3, wherein the first coating layer 35 and the second coating layer 36 both contain Si, the adhesion of the second coating layer 36 to the first coating layer 35 was improved. According to the experimental examples 2 and 3, wherein the thickness of the intermediate layer was made larger, the value of the load when the second coating layer 36 began to be separated or peeled off was increased.

The following will describe a sliding member for a compressor according to a fourth preferred embodiment of the present invention as embodied in a shoe of the variable displacement piston type compressor. Though not shown in the drawing, the shoe of the fourth preferred embodiment has two layers as in the case of the first preferred embodiment of FIG. 2, but nitrogen (N) is used as an additive instead of silicon (Si).

According to the fourth preferred embodiment, the shoe has a base metal made of aluminum-based metal and a first coating layer made of a nickel-based plating layer containing N as an additive and formed on the surface of the base metal. Specifically, the first coating layer is made of Ni—P plating layer containing N. The first coating layer is formed by dipping the base metal into a plating solution so as to form a Ni—P plating layer on the surface of the base metal and then ion-implanting nitrogen into the Ni—P plating layer. Thus, the surface of the first coating layer is nitrided.

A second coating layer made of the DLC layer containing N as an additive is formed on the surface of the first coating layer. The second coating layer is formed firstly by cleaning the surface of the first coating layer by sputtering the oxide film which is formed on the surface of the first coating layer. Then, nitrogen is ion-implanted into the surface of the first coating layer and DLC containing N is deposited on the first coating layer. Therefore, the shoe is formed in such a manner that the first coating layer as an intermediate layer is formed between the base metal and the second coating layer and the first and second coating layers both containing N are multilayered on the surface of the base metal.

According to the fourth preferred embodiment, the first coating layer serves as a first layer, and the second coating layer serves as a second layer.

The fourth preferred embodiment has the following advantageous effects in addition to the effects (2) and (3) of the first preferred embodiment.

(6) The first coating layer is formed on the surface of the base metal made of aluminum-based metal, and the second coating layer is formed on the surface of the first coating layer. The first coating layer is made of a metal layer containing N, and the second coating layer is made of a ceramic layer containing N. Because the first and second coating layers both contain N, the two layers made of different materials adhere to each other, successfully. Therefore, adhesion between the first and second coating layers may be improved and the second coating layer may be prevented from being separated from the first coating layer.

The following will describe a sliding member for a compressor according to a fifth preferred embodiment of the present invention as embodied in a shoe of the variable displacement piston type compressor. Though not shown in the drawing, the shoe of the fifth preferred embodiment has three layers as in the second preferred embodiment shown in FIG. 3, but nitrogen (N) is used as the additive instead of silicon (Si).

The shoe has a nickel-based plating layer containing no additive which is made of Ni—P plating layer containing no N as an additive and formed on the surface of the base metal and the first coating layer (Ni—P plating layer containing N) which is the same as that of the fourth preferred embodiment and formed on the surface of the nickel-based plating layer containing no additive. In other words, the shoe of the fifth preferred embodiment is formed in such a manner that the Ni—P plating layer containing no additive which is contained in the first coating layer is provided between the base metal and the first coating layer. The shoe further has the second coating layer (DLC layer containing N) which is the same as that of the fourth preferred embodiment. According to the fifth preferred embodiment, the first coating layer and the Ni—P plating layer serve as an intermediate layer formed between base metal and the second coating layer.

According to the fifth preferred embodiment, the first coating layer serves as a first layer, the second coating layer serves as a second layer and the nickel-based plating layer containing no additive which is contained in the first coating layer serves as a third layer.

The fifth preferred embodiment has the following advantageous effects in addition to the effects (2) and (3) of the first preferred embodiment and the effect (6) of the fourth preferred embodiment.

(7) The thickness of the intermediate layer formed between the base metal and the second coating layer is increased, so that the intermediate layer is hardly deformed and, therefore, the second coating layer is prevented from cracking.

The following will describe a sliding member for a compressor according to a sixth preferred embodiment of the present invention as embodied in a shoe of the variable displacement piston type compressor. The shoe of the sixth preferred embodiment has four layers as in the third preferred embodiment of FIG. 4, but nitrogen (Ni) is used as the additive instead of silicon (Si).

The shoe of the sixth preferred embodiment has a Ni—P plating layer containing no N as the additive which is formed on the surface of the base metal and serving as a nickel-based plating layer and the first coating layer (Ni—P plating layer containing N) which is the same as that of the fourth preferred embodiment and formed on the surface of the Ni—P plating layer containing no N. In other words, the shoe of the sixth preferred embodiment is formed in such a manner that the Ni—P plating layer containing no additive which is contained in the first coating layer is provided between the base metal and the first coating layer.

The shoe of the sixth preferred embodiment further has the second coating layer (DLC layer containing N) which is the same as that of the fourth preferred embodiment and formed on the surface of the first coating layer and the DLC layer containing no N as an additive which is formed on the surface of the second coating layer. The first coating layer and the Ni—P plating layer cooperate to form an intermediate layer between the base metal and the second coating layer, and two layers formed mainly of DLC is formed on the intermediate layer.

According to the sixth preferred embodiment of the present invention, the first coating layer serves as a first layer, the second coating layer serves as a second layer, the Ni—P plating layer containing no additive which is contained in the first coating layer serves as a third layer and the DLC layer containing no additive which is contained in the second coating layer serves as an outer layer.

The sixth preferred embodiment has the following advantageous effects in addition to the effects (2), (3) of the first preferred embodiment, the effect (6) of the fourth preferred embodiment and the effect (7) of the fifth preferred embodiment.

(8) The thickness of the intermediate layer and the layer formed mainly of DLC and provided on the intermediate layer is increased, so that these two layers are hardly deformed and, therefore, the second coating layer is prevented from cracking. DLC layer containing no Ni is provided on the outermost surface of the shoe. In comparison with a case where the outermost surface of the shoe is formed by the second coating layer, the hardness of the outermost surface of the shoe is made greater and the coefficient friction is made lower.

The flowing will describe the fourth through sixth preferred embodiments more in detail with reference to FIG. 6 showing the experimental examples 4 through 6 and comparative examples 4 through 6. Scratch test for adhesion evaluation of films was conducted using six shoes of the experimental example 4 through 6 and the comparative examples 4 through 6 in the same manner as the scratch test using the six shoes of the experimental example 1 through 3 and the comparative examples 1 through 3.

Referring to FIG. 6, in the experimental example 4, the adhesive of the second coating layer (DLC layer containing N) was measured by performing the scratch test using a shoe made according to the fourth preferred embodiment, and the thickness of the intermediate layer (Ni—P plating layer containing N) was set 5 μm. In the experimental example 5, adhesion of the second coating layer (DLC layer containing N) was measured by performing the scratch test using a shoe made according the fifth preferred embodiment, and the thickness of the intermediate layer (Ni—P plating layer+Ni—P plating layer containing N) is set 20 μm.

In the experimental example 6, adhesion of the second coating layer (DLC layer containing N) is measured by performing the scratch test using a shoe made according the sixth preferred embodiment, and the thickness of the intermediate layer (Ni—P plating layer+Ni—P plating layer containing N) was set 20 μm. In the experimental examples 4 through 6, the second coating layer contains 8 atomic percent nitrogen.

In the comparative example 4, adhesion of the DLC layer to the base metal was measured by performing the scratch test using a shoe in which no intermediate layer was formed on the surface of the base metal and the DLC layer containing no N was formed directly on the surface of the base metal. In the comparative example 5, adhesion of the DLC layer to the intermediate layer was measured by performing the scratch test using a shoe in which a Ni—P plating layer containing no N was provided on the surface of the base metal as the intermediate layer and the DLC layer containing no N was provided on the surface of the Ni—P plating layer, and the thickness of the intermediate layer (Ni—P plating layer) was set 5 μm. In the comparative example 6, adhesion of the DLC layer to the intermediate layer was measured by performing the scratch test using a shoe in which a Ni—P plating layer containing no N was formed on the surface of the base metal as the intermediate layer and the DLC layer containing no N was formed on the surface of the Ni—P plating layer, and the thickness of the intermediate layer (Ni—P plating layer) was set 20 μm.

The results of the scratch tests are shown in FIG. 6. The values of the load when the second coating layer (DLC layer containing N) is being separated in the experimental examples 4 through 6 are much larger than the values of the load when the DLC layer is being separated in the comparative examples 4 through 6, respectively. According to the experimental examples 4 through 6, wherein nitrogen is contained in the first and second coating layers, adhesion of the second coating layer to the first coating layer was improved. According to experimental examples 5 and 6, the value of the load when the second coating layer began to be separated was increased with an increase of the thickness of the intermediate layer.

The following will describe a sliding member for a compressor according to a seventh preferred embodiment of the present invention as embodied in a shoe of the variable displacement piston type compressor. The shoe of the seventh preferred embodiment is of a structure that is similar to that of FIG. 4, but has no Ni—P plating layer 37 of FIG. 4, so that the shoe of the seventh preferred embodiment is not shown in the drawings.

The shoe of the seventh preferred embodiment has the first coating layer (Ni—P plating layer containing Si) which is the same as that of the first preferred embodiment and formed on the surface of the base metal. The shoe of the seventh preferred embodiment further has the second coating layer (DLC layer containing Si) which is the same as that of the first preferred embodiment and formed on the surface of the first coating layer and a DLC layer containing no Si as the additive which is formed on the second coating layer. According to the seventh preferred embodiment, the first coating layer serves an intermediate layer between the base metal and the second coating layer.

According to the seventh preferred embodiment, the first coating layer serves a first layer, the second coating layer serves as a second layer and the DLC layer containing no additive which is contained in the second coating layer serves as an outer layer.

The seventh preferred embodiment has the same advantageous effects as the effects (1) through (3) of the first preferred embodiment.

The following will describe a sliding member for a compressor according to an eighth preferred embodiment of the present invention as embodied in a shoe of the variable displacement piston type compressor. Since the shoe of the eighth preferred embodiment has the same structure as the shoe shown in FIG. 4 except that no Ni—P plating layer 37 is present and that the additive is changed from silicon (Si) to nitrogen (Ni), the shoe of the eighth preferred embodiment is not shown in the drawings.

The shoe of the eighth preferred embodiment has the first coating layer (Ni—P plating layer containing N) which is the same as that of the fourth preferred embodiment and formed on the surface of the base metal. The shoe of the eighth preferred embodiment further has the second coating layer (DLC layer containing N) which is the same as that of the fourth preferred embodiment and formed on the surface of the first coating layer and a DLC layer containing no N as the additive which is formed on the surface of the second coating layer. According to the eighth preferred embodiment, the first coating layer serves as an intermediate layer between the base metal and the second coating layer.

According to the eighth preferred embodiment, the first coating layer serves as a first layer, the second coating layer serves as a second layer and the DLC layer containing no additive which is contained in the second coating layer serves as an outer layer.

The eighth preferred embodiment has the same advantageous effects as the effects (2) and (3) of the first preferred embodiment and the effects (6) of the fourth preferred embodiment.

The flowing will describe the seventh and eighth preferred embodiments in detail with reference to FIG. 7 showing the examples 7 through 10.

Referring to FIG. 7, in the experimental example 7, the second coating layer of the shoe of the seventh preferred embodiment contains 1 atomic percent silicon. In the experimental example 8, the second coating layer of the shoe of the seventh preferred embodiment contains 22 atomic percent silicon. Adhesion of the second coating layer (DLC layer containing Si) was measured by the scratch test using shoes of the experimental examples 7 and 8. As shown in FIG. 7, in the experimental examples 7 and 8, the thickness of the intermediate layer (Ni—P plating layer containing Si) was set 20 μm.

In the experimental example 9, the second coating layer of the shoe of the eighth preferred embodiment contains 1 atomic percent nitrogen. In the experimental example 10, the second coating layer of the shoe of the eighth preferred embodiment contains 23 atomic percent nitrogen. Adhesion of the second coating layer (DLC layer containing N) was measured by the scratch test using shoes in the experimental examples 9 and 10. As shown in FIG. 7, in the experimental examples 9 and 10, the thickness of the intermediate layer (Ni—P plating layer containing N) was set 20 μm.

The results of the scratch tests are shown in FIG. 7. As shown in FIG. 7, the silicon concentration in the experimental example 8 was higher than that in the experimental example 7, and the value of the load in the experimental example 8 when the second coating layer began to be peeled off was greater than that in the experimental example 7. The nitrogen concentration in the experimental example 10 was higher than that in the experimental example 9, and the value of the load in the example 10 when the second coating layer began to be peeled off was greater than that in the experimental example 9. As obvious from the above, adhesion of the second coating layer to the first coating layer is improved by increasing the concentration of the additive of the second coating layer.

The above embodiments may be modified as follows.

In the first through third preferred embodiments, the additive contained in the Ni—P plating layer and the DLC layer may be changed to any one of metals of titanium (Ti), chromium (Cr) and aluminum (Al).

In the first through third preferred embodiments, the additive contained in the Ni—P plating layer and the DLC layer may be changed to any combination of materials of silicon (Si), titanium (Ti), chromium (Cr) and aluminum (Al). For example, the additive contained in the Ni—P plating layer and the DLC layer may be changed to silicon (Si) and titanium (Ti).

The present invention may be applied to a sliding member for a compressor such as a scroll type compressor, a vane type compressor or a root type compressor.

What is claimed is:

1. A sliding member for a compressor comprising:

a base metal made of an aluminum-based metal;

a first layer formed on or over the base metal and made of nickel-based plating layer containing at least one additive selected from the group consisting of nitrogen (N), silicon (Si), titanium (Ti), chromium (Cr) and aluminum (Al); and a second layer made of a diamond-like carbon layer containing the same at least one additive as selected in the first layer and formed on the surface of the first layer within which the same additive is present, wherein adhesion between the first and second layers is increased, as compared to adhesion in the absence of the at least one additive from both layers.

2. The sliding member for the compressor according to claim 1, further comprising a third layer made of a nickel-based plating layer containing none of said same at least one additive, and is formed between the base metal and the first layer.

3. The sliding member for the compressor according to claim 2, wherein the first and third layers are made of a nickel-phosphorus plating layer.

4. The sliding member for the compressor according to claim 1, further comprising an outer layer made of a diamond-like carbon layer containing none of said at least one additive, and is formed on the surface of the second layer.

5. The sliding member for the compressor according to claim 1, wherein the sliding member is a shoe, a piston or a swash plate.

6. The sliding member for the compressor according to claim 1, wherein the diamond-like carbon layer is formed by a process of chemical vapor deposition (CVD) or physical vapor deposition (PVD).

* * * * *